(12) United States Patent
Kwon et al.

(10) Patent No.: US 11,904,696 B1
(45) Date of Patent: Feb. 20, 2024

(54) VEHICLE DRIVE DEVICE

(71) Applicant: TOYOTA JIDOSHA KABUSHIKI KAISHA, Toyota (JP)

(72) Inventors: Hyuk Soo Kwon, Anjo (JP); Ayako Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/210,153

(22) Filed: Jun. 15, 2023

(30) Foreign Application Priority Data

Sep. 5, 2022 (JP) .................................. 2022-141036

(51) Int. Cl.
| | |
|---|---|
| *B60K 6/405* | (2007.10) |
| *B60K 6/26* | (2007.10) |
| *F16H 37/08* | (2006.01) |
| *B60K 6/365* | (2007.10) |
| *F16H 57/02* | (2012.01) |
| *F16H 57/12* | (2006.01) |
| *F16H 48/36* | (2012.01) |

(52) U.S. Cl.
CPC ............... *B60K 6/405* (2013.01); *B60K 6/26* (2013.01); *B60K 6/365* (2013.01); *F16H 37/0806* (2013.01); *B60Y 2200/92* (2013.01); *F16H 2048/364* (2013.01); *F16H 2057/02034* (2013.01); *F16H 2057/02043* (2013.01); *F16H 2057/122* (2013.01)

(58) Field of Classification Search
CPC .......... B60K 6/405; B60K 6/26; B60K 6/365; B60Y 2200/32; F16H 37/0806; F16H 2057/02034; F16H 2057/02043; F16H 2048/364; F16H 2057/122
USPC .............................................................. 475/5
See application file for complete search history.

(56) References Cited

U.S. PATENT DOCUMENTS

| | | | | |
|---|---|---|---|---|
| 2017/0113535 | A1* | 4/2017 | Hirano | ................ F16H 37/0806 |
| 2019/0329642 | A1* | 10/2019 | Hori | ...................... F16H 57/037 |
| 2020/0171931 | A1* | 6/2020 | Cho | ........................ B60K 6/442 |
| 2021/0402867 | A1* | 12/2021 | Kato | ........................ B60K 6/40 |

FOREIGN PATENT DOCUMENTS

JP 2014-119071 A 6/2014

* cited by examiner

*Primary Examiner* — Colby M Hansen
(74) *Attorney, Agent, or Firm* — Oliff PLC

(57) ABSTRACT

Power is transmitted between the input shaft and the rotor shaft by the sun gear and the gear meshing. This eliminates the need for bearings to receive radial loads. Further, a thrust bearing disposed between the one axial end surface of the sun gear and the input shaft, and a second ball bearing abutting the other axial end surface of the sun gear are provided. This eliminates the need for a bearing for receiving a thrust load of the sun gear. A terminal block is arranged in a space opposite to the planetary gear device with respect to the electric motor caused by the reduction of the bearing. Therefore, it is possible to dispose the terminal block while suppressing or avoiding the increase in the size of the vehicle drive device.

5 Claims, 5 Drawing Sheets

VEHICLE DRIVE DEVICE

CROSS-REFERENCE TO RELATED APPLICATION

This application claims priority to Japanese Patent Application No. 2022-141036 filed on Sep. 5, 2022, incorporated herein by reference in its entirety.

BACKGROUND

1. Technical Field

The present disclosure relates to a vehicle drive device including an electric motor and a planetary gear device.

2. Description of Related Art

A vehicle drive device including an electric motor, an input shaft to which power from an engine is input, a rotor shaft integrally connected to a rotor of the electric motor, a planetary gear device including a sun gear connected to the rotor shaft so as to be able to transmit power, a carrier connected to the input shaft so as to be able to transmit power, and a ring gear connected to a drive wheel so as to be able to transmit power, and a case that is a non-rotating member disposed in an engine compartment in which the electric motor, the input shaft, the rotor shaft, and the planetary gear device are housed on a same axis, is well known. For example, a power transmission device according to Japanese Unexamined Patent Application Publication No. 2014-119071 (JP 2014-119071 A) is the vehicle drive device described above. The power transmission device according to JP 2014-119071 A includes a power transmission member that connects the sun gear and the rotor shaft, and JP 2014-119071 A discloses that the sun gear and the power transmission member are positioned in a thrust direction by providing a thrust bearing that supports the power transmission member with respect to a partition wall of the case facing the planetary gear device such that the power transmission member is rotatable, and a thrust bearing disposed between the sun gear and the input shaft.

SUMMARY

A vehicle drive device including an electric motor needs to include a terminal block that electrically connects an electric circuit unit for controlling the electric motor and the electric motor. On the other hand, in consideration of a limited space in an engine compartment in which the vehicle drive device is disposed, it is desirable to suppress or avoid an increase in the size of the vehicle drive device as much as possible. For example, in the vehicle drive device, when the electric circuit unit or the like is disposed above the electric motor or the like in a vertical direction, the size of the vehicle drive device may increase depending on the position where the terminal block is disposed. There is room for improvement when the terminal block is disposed.

The present disclosure has been made in the background of the above circumstances, and an object of the present disclosure is to provide a vehicle drive device capable of disposing the terminal block while suppressing or avoiding the increase in the size of the vehicle drive device.

A first aspect of the present disclosure provides a vehicle drive device. The vehicle drive device includes:

(a) an electric motor;
an input shaft to which power from an engine is input;
a rotor shaft integrally connected to a rotor of the electric motor;
a planetary gear device including a sun gear connected to the rotor shaft so as to be able to transmit power, a carrier connected to the input shaft so as to be able to transmit power, and
a ring gear connected to a drive wheel so as to be able to transmit power; and
a case that is a non-rotating member disposed in an engine compartment in which the electric motor, the input shaft, the rotor shaft, and the planetary gear device are housed on a same axis.

In the vehicle drive device, (b) the input shaft, the rotor shaft, and the sun gear are disposed such that power is transmitted when each of the input shaft and the rotor shaft meshes with the sun gear; and the vehicle drive device includes
(c) a first ball bearing that supports the input shaft with respect to the case such that the input shaft is rotatable,
(d) a thrust bearing disposed between one end surface of the sun gear in a direction of an axis and the input shaft,
(e) a second ball bearing that is in contact with another end surface of the sun gear in the direction of the axis and that supports the rotor shaft with respect to the case such that the rotor shaft is rotatable, and
(f) a terminal block that is disposed in a space on an opposite side of the electric motor from the planetary gear device and that electrically connects an electric circuit unit for controlling the electric motor and the electric motor.

According to the first aspect, the power is transmitted when each of the input shaft and the rotor shaft meshes with the sun gear. Thus, a radial load of the sun gear can be received by the meshing of each of the input shaft and the rotor shaft, and a bearing for receiving the radial load of the sun gear is not required. The dimension in the direction of the axis can be reduced by an amount in which the bearing for receiving the radial load is removed. Further, the thrust bearing disposed between the one end surface of the sun gear in the direction of the axis and the input shaft, and the second ball bearing that is in contact with the other end surface of the sun gear in the direction of the axis and that supports the rotor shaft with respect to the case such that the rotor shaft is rotatable are provided. Thus, the sun gear can be sandwiched between the thrust bearing and the second ball bearing, and the bearing for receiving a thrust load of the sun gear is not required. The dimension in the direction of the axis can be reduced by an amount in which the bearing for receiving the thrust load is removed. Then, the terminal block for electrically connecting the electric circuit unit for controlling the electric motor and the electric motor is disposed in a space on an opposite side of the electric motor from the planetary gear device, the space being a space in the direction of the axis generated as a result of removal of the bearing. Therefore, it is possible to dispose the terminal block while suppressing or avoiding the increase in the size of the vehicle drive device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram for explaining an example of an electrical configuration of an electric circuit unit or the like;

DETAILED DESCRIPTION OF EMBODIMENTS

Hereinafter, examples of the present disclosure will be described in detail with reference to the drawings.

Figure 1:
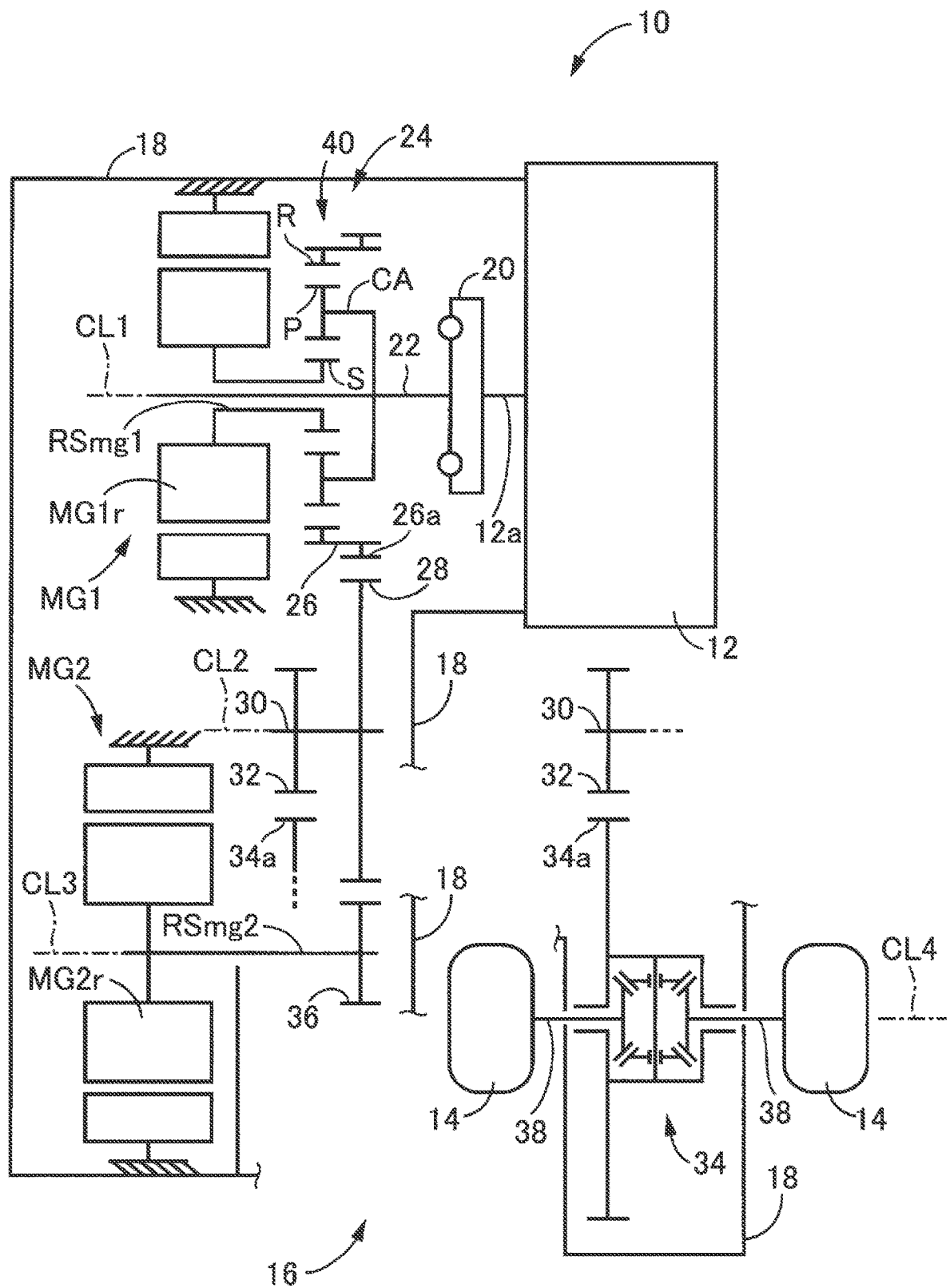
FIG. 1 is a diagram illustrating an example of a schematic configuration of a vehicle to which the present disclosure is applied.

FIG. 1 is a diagram illustrating an example of a schematic configuration of a vehicle 10 to which the present disclosure is applied. In FIG. 1, a vehicle 10 includes an engine 12, drive wheels 14, and a drive device 16. The engine 12 is a known internal combustion engine. The drive device 16 includes a first electric motor MG1 and a second electric motor MG2, and is a vehicle drive device that transmits power of each of the engine 12 and the second electric motor MG2 to the drive wheels 14. The vehicle 10 is an electrified vehicle, in particular a hybrid electric vehicle, with an engine 12 and a second electric motor MG2, which serve as a power source.

Each of the first electric motor MG1 and the second electric motor MG2 is a known rotary electric machine having a function as an engine for generating mechanical power from electric power and a function as a generator for generating electric power from mechanical power, and is a so-called motor generator. The first electric motor MG1 and the second electric motor MG2 are provided in a non-rotatable case 18 which is a non-rotatable member attached to the vehicle body.

The drive device 16 includes a case 18 disposed in the engine compartment of the vehicle 10 (see FIG. 5 described later). The engine compartment 50 is a power source compartment that is in agreement with the engine compartment and houses the engine 12. The drive device 16 includes a damper 20, an input shaft 22, a transmission unit 24, a composite gear 26, a driven gear 28, a driven shaft 30, a final gear 32, a differential gear 34, a reduction gear 36, and the like in the case 18. The drive device 16 includes a rotor shaft RSmg1 integrally connected to the rotor MG1r of the first electric motor MG1 and a rotor shaft RSmg2 integrally connected to the rotor MG2r of the second electric motor MG2 in the case 18. The drive device 16 includes a pair of drive shafts 38 and the like connected to the differential gear 34.

The input shaft 22 functions as an input rotating member of the transmission unit 24 and is connected to the crankshaft 12a of the engine 12 via a damper 20 or the like. The input shaft 22 receives power from the engine 12. The transmission unit 24 is connected to the input shaft 22. The composite gear 26 is a rotating body on the output side of the transmission unit 24. In the composite gear 26, a drive gear 26a is formed on a part of the outer peripheral surface. The drive gear 26a is an output-rotating member of the transmission unit 24. The driven gear 28 meshes with the drive gear 26a. The driven shaft 30 fixes the driven gear 28 and the final gear 32 so as not to be relatively rotatable. The final gear 32 is smaller in diameter than the driven gear 28 and meshes with the differential gear 34a of the differential gear 34. The reduction gear 36 is smaller in diameter than the driven gear 28 and meshes with the driven gear 28. The reduction gear 36, the rotor shaft RSmg2 is connected, the second electric motor MG2 is connected to the power transmissible.

The drive device 16 configured as described above is suitably used for vehicles of FF (front engine/front drive) type or RR (rear engine/rear drive) type. The drive device 16 transmits the power output from the engine 12 to the driven gear 28 via the transmission unit 24. Further, the drive device 16 transmits the power outputted from the second electric motor MG2 to the driven gear 28 via the reduction gear 36. The drive device 16 transmits the power transmitted to the driven gear 28 to the drive wheels 14 through the driven shaft 30, the final gear 32, the differential gear 34, the drive shaft 38, and the like in order.

The transmission unit 24 includes a first electric motor MG1, a rotor shaft RSmg1, and a planetary gear device 40. The planetary gear device 40 is a known single pinion type planetary gear device including a sun gear S, a carrier CA, a ring gear R, and a pinion P. The sun gear S is connected to the rotor shaft RSmg1 so as to be capable of transmitting power. That is, the first electric motor MG1 of the sun gear S is connected so as to be capable of transmitting power. The carrier CA is connected to the input shaft 22 so as to be capable of transmitting power. That is, the carrier CA is connected to the engine 12 via the input shaft 22 or the like so as to be capable of transmitting power. The ring gear R is formed on a part of the inner circumferential surface of the composite gear 26 and is integrally connected to the drive gear 26a. That is, the ring gear R is connected to the drive wheels 14 so as to be capable of transmitting power. The pinion P is supported by a carrier CA so as to be capable of rotating and revolving. The ring gear R meshes with the sun gear S via the pinion P.

The planetary gear device 40 functions as a differential mechanism for differential operation. The planetary gear device 40 is a power split mechanism that mechanically divides the power of the engine 12 inputted to the carrier CA into a first electric motor MG1 and a drive gear 26a. The transmission unit 24 is a known electric transmission mechanism that includes a planetary gear device 40 to which the engine 12 is connected to be capable of transmitting power, and a first electric motor MG1 that is connected to the planetary gear device 40 to be capable of transmitting power, and controls the differential state of the planetary gear device 40 by controlling the operating state of the first electric motor MG1.

The drive device 16 has a first axis CL1, a second axis CL2, a third axis CL3, and a fourth axis CL4. These four axes CL1, CL2, CL3, CL4 are parallel to each other. The first axis CL1 is an axis center of the input shaft 22 or the rotor shaft RSmg1. That is, the first axis CL1 is the rotational axis of the first electric motor MG1. The transmission unit 24 is disposed around the first axis CL1. The first axis CL1 is also the rotational axis of the planetary gear device 40. The first electric motor MG1 is an electric motor arranged on a first axis CL1 that is the same axis as the input shaft 22, the rotor shaft RSmg1, and the planetary gear device 40. The case 18 accommodates the first electric motor MG1, the input shaft 22, the rotor shaft RSmg1, and the planetary gear device 40 on the first axis CL1.

The second axis CL2 is the axis of the driven shaft 30. The driven gear 28 and the final gear 32 are disposed around the second axis CL2. That is, the second axis CL2 is the rotational axis of the driven gear 28, the driven shaft 30, and the final gear 32. The third axis CL3 is an axis center of the rotor shaft RSmg2 of the second electric motor MG2. That is, the third axis CL3 is the rotational axis of the second electric motor MG2. The second electric motor MG2 and the reduction gear 36 are disposed around the third axis CL3. The fourth axis CL4 is an axis of the drive shaft 38 and an axis of the differential gear 34. That is, the fourth axis CL4 is the rotational axis of the differential gear 34. The differential gear 34 is disposed around the fourth axis CL4.

Figure 2:
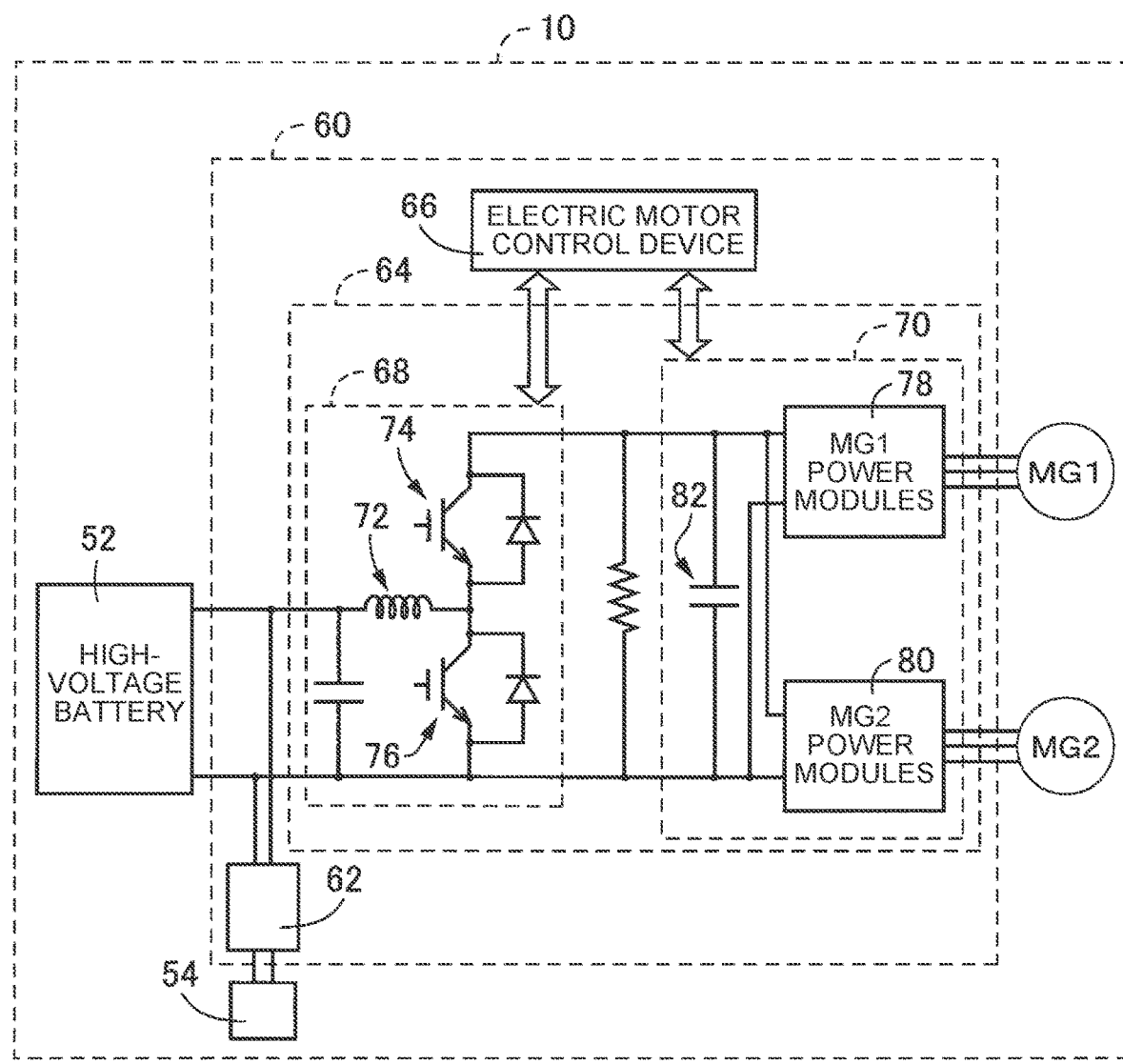

FIG. 2 is a diagram for explaining an example of an electrical configuration of the electric circuit unit 60 and the like. In FIG. 2, the vehicle 10 further includes a high voltage battery 52, an auxiliary battery 54, and the like. The drive device 16 further includes an electric circuit unit 60 that controls the first electric motor MG1 and the second electric motor MG2.

The high-voltage battery 52 is a chargeable/dischargeable DC power source, and is a secondary battery such as a nickel-hydrogen secondary battery or a lithium-ion battery. The high-voltage battery 52 is connected to the electric circuit unit 60.

Electric power stored in the high-voltage battery 52 is supplied to the first electric motor MG1 and the second electric motor MG2 via the electric circuit unit 60. The high-voltage battery 52 is supplied with electric power by the power generation control of the first electric motor MG1 and electric power by the regenerative control of the second electric motor MG2 via the electric circuit unit 60. The high-voltage battery 52 is a battery for driving.

The electric circuit unit 60 includes DCDC converters 62, a power control circuit 64, and an electric motor control device 66.

DCDC converters 62 are connected to the high voltage battery 52. DCDC converter 62 functions as a charging device that reduces the voltage of the high-voltage battery 52 to a voltage equivalent to that of the auxiliary battery 54 and charges the auxiliary battery 54. The auxiliary battery 54 supplies electric power for operating the auxiliary machine provided in the vehicle 10. The auxiliary battery 54 supplies electric power for operating an electronic control device such as the electric motor control device 66 provided in the vehicle 10.

The power control circuit 64 includes a boost converter 68, an inverter 70, and the like. The power control circuit 64 controls the power exchanged between the high-voltage battery 52 and the first electric motor MG1 and the second electric motor MG2. The boost converter 68 includes a reactor 72 and two switching elements 74 and 76. The inverter 70 includes a MG1 power module 78, a MG2 power module 80, a capacitor 82, and the like. MG1 power module 78 and MG2 power module 80 each include a switching element and the like similar to the switching elements 74 and 76.

The boost converter 68 is a step-up/step-down circuit having a function of boosting the voltage of the high-voltage battery 52 and supplying the voltage to the inverter and a function of stepping down the voltage converted into a direct current by the inverter 70 and supplying the stepped-down voltage to the high-voltage battery 52.

The inverter 70 converts the direct current from the boost converter 68 into an alternating current for driving the first electric motor MG1 and the second electric motor MG2. The inverter 70 converts an alternating current generated by the first electric motor MG1 by the power of the engine 12 and an alternating current generated by the second electric motor MG2 by the regenerative braking into a direct current. The inverter 70 supplies the alternating current generated by the first electric motor MG1 as the driving power of the second electric motor MG2 in accordance with the running condition.

The electric motor control device 66 controls the boost converter 68 and the inverter 70. For example, the electric motor control device 66 converts the direct current from the high-voltage battery 52 into an alternating current used for the first electric motor MG1 and the second electric motor MG2. The electric motor control device 66 drives the first electric motor MG1 in order to secure a power generation required to supply electric power to the second electric motor MG2 and to charge the high-voltage battery 52. The electric motor control device 66 drives the second electric motor MG2 on the basis of a required value corresponding to a required torque of the driver. The electric motor control device 66 causes the second electric motor MG2 to function as a generator in accordance with the required quantity of the regenerative braking.

Figure 3:
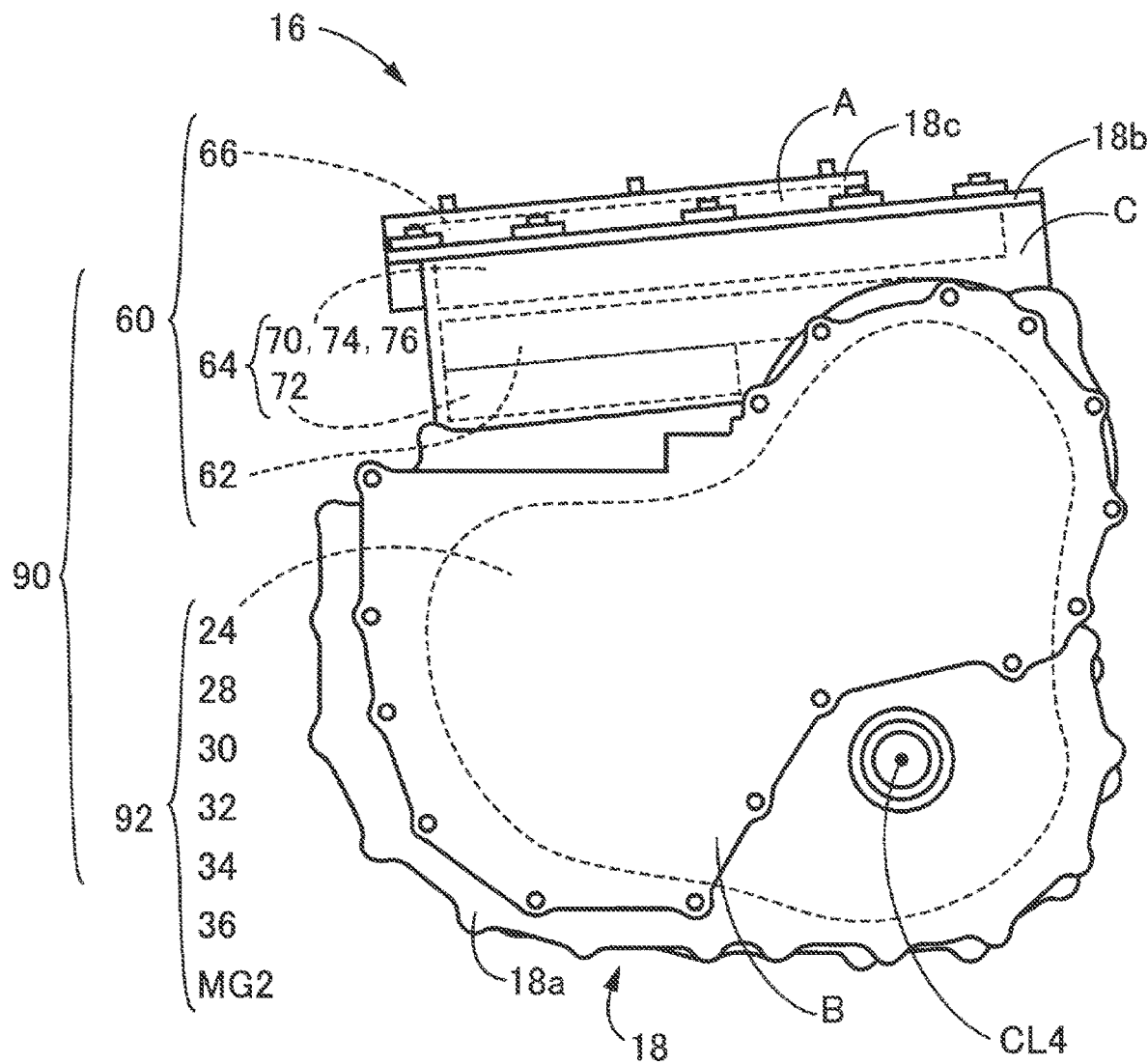
FIG. 3 is a diagram illustrating an example of a schematic configuration of an electromechanical integrated unit.
Figure 3:
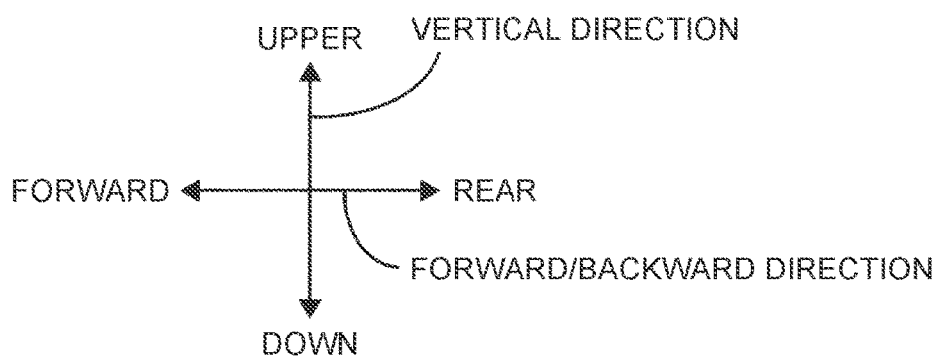

FIG. 3 is a diagram illustrating an example of a schematic configuration of the electromechanical integrated unit 90. In FIG. 3, the case 18 accommodates the mechanical transmission unit 92 and the electric circuit unit 60 as the electromechanical integrated unit 90. The mechanical transmission unit 92 constitutes a part of the drive device 16. The mechanical transmission unit 92 includes a transmission unit 24 (a first electric motor MG1, a rotor shaft RSmg1, an input shaft 22, a planetary gear device 40, and the like), a second electric motor MG2, a driven gear 28, a driven shaft 30, a final gear 32, a differential gear 34, a reduction gear 36, and the like.

The case 18 includes, for example, a main body 18a, a cover plate 18b, and a protective cover 18c. The main body 18a has a bottom wall and a side wall extending vertically upward from an outer peripheral edge of the bottom wall, and an upper portion in the vertical direction is opened. The cover plate 18b is a plate-shaped member that closes a portion of the opening of the main body 18a. The protective cover 18c is provided on the vertical upper surface of the cover plate 18b, and forms a predetermined space A with the upper surface of the cover plate 18b. The main body 18a has a partition wall (not shown), and the inside thereof is partitioned into two spaces of a space B in a vertical lower portion and a space C in a vertical upper portion by the partition wall. Note that the vertical direction and the forward/backward direction in the drawing indicate the direction in the mounted state of the vehicle 10.

The mechanical transmission unit 92 is accommodated in the space B in the vertical lower portion of the main body 18a in the mounted condition of the vehicle 10.

DCDC converters 62 and the power control circuit 64 of the electric circuit unit 60 are accommodated in the space C in the vertical upper portion of the main body 18a in the mounted condition of the vehicle 10.

A reactor 72 having a relatively short length among DCDC converters 62 and the power control circuit 64 is accommodated in a vertical lower portion of the vertical upper space C. In addition, DCDC converters 62 are housed vertically above the reactor 72 for ease of replacement. The inverter 70 and the switching elements 74 and 76 of the power control circuit 64 are accommodated in an upper portion of the vertical upper space C in the vertical direction.

The electric motor control device 66 of the electric circuit unit 60 is accommodated in a predetermined space A formed vertically upward by the protective cover 18c in the mounted condition of the vehicle 10. It should be noted that, in the vehicles 10, the predetermined space A formed by the protective cover 18c may not be formed, and the electric motor control device 66 may be accommodated in the space C in the vertical upper part.

When the electromechanical integrated unit 90 is disposed in the engine compartment 50, it is desired to reduce the size of the electromechanical integrated unit 90 in the vertical direction. On the other hand, the electromechanical integrated unit 90 needs to include, for example, a terminal block 100 (see FIG. 4 to be described later) that electrically connects the electric circuit unit 60 and the first electric motor MG1. Depending on the position where the terminal block 100 is arranged, the size of the electromechanical integrated unit 90 in the vertical direction may be increased.

Therefore, in the driving device 16 of the present embodiment, the terminal block 100 is disposed in the space D facing away from the planetary gear device 40 with respect to the first electric motor MG1 (see FIG. 4 described later).

Figure 4:
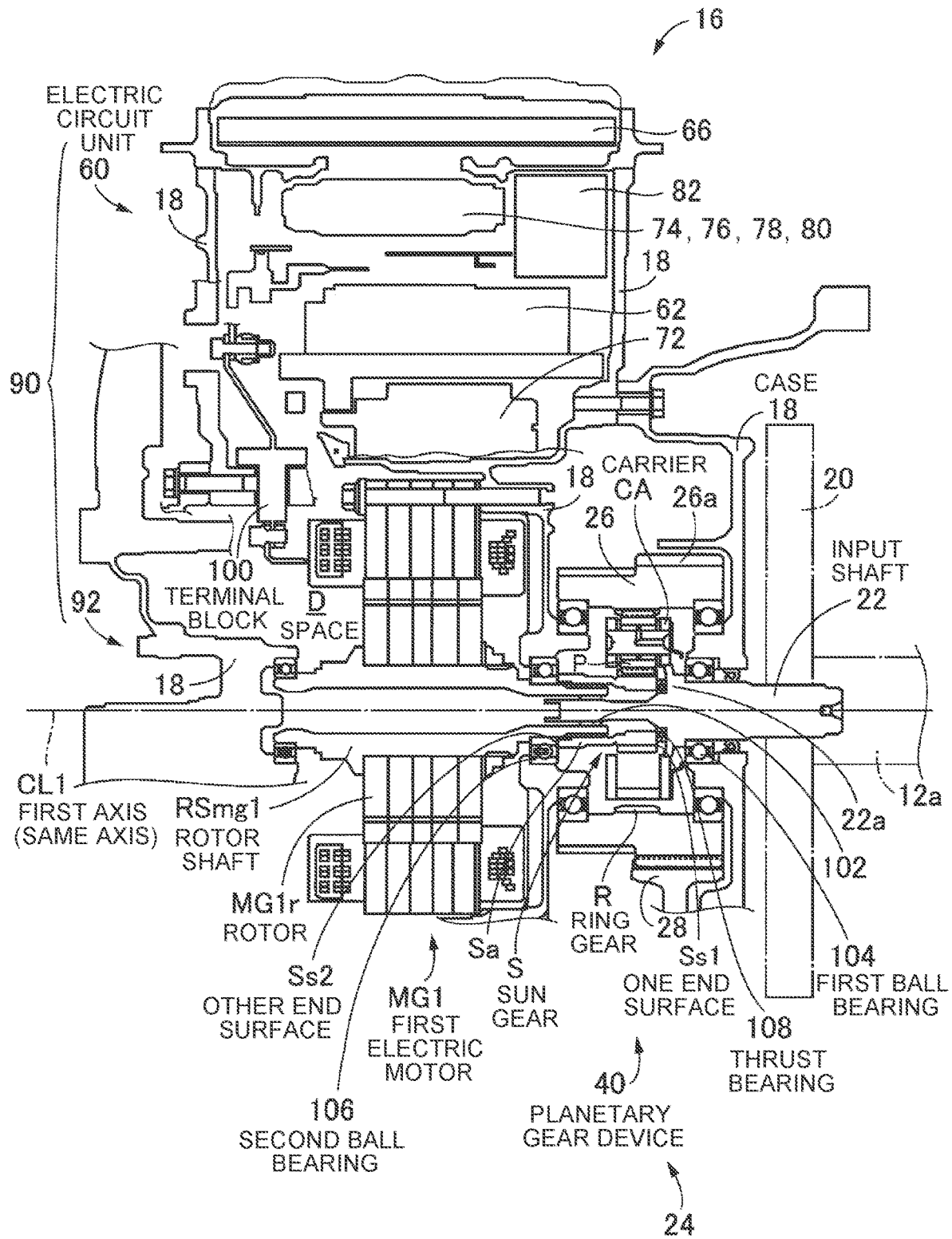
FIG. 4 is a diagram for explaining an exemplary arrangement position of a terminal block.

FIG. 4 is a diagram illustrating an example of an arrangement position of the terminal block 100. FIG. 4 shows a cross-sectional view of a transmission unit 24 and an electric circuit unit 60 of the mechanical transmission unit 92 arranged around the first axis CL1.

In FIG. 4, in the drive device 16, the input shaft 22, the rotor shaft RSmg1, and the sun gear S of the planetary gear device 40 are arranged so that the input shaft 22 and the rotor shaft RSmg1 are respectively transmitted by the sun gear S and the gear meshing. For example, the drive device 16 includes a needle bearing 102. The input shaft 22 and the rotor shaft RSmg1 are connected to each other via a needle bearing 102 so as to be relatively rotatable. Further, the sun gear S is formed with a cylindrical extension portion Sa extending toward the first electric motor MG1 in the first axis CL1. The gear engagement between the rotor shaft RSmg1 and the sun gear S is a spline-fitting between the outer peripheral surface of the rotor shaft RSmg1 and the inner peripheral surface of the cylindrical extension portion Sa. Further, the input shaft 22 is formed with a flange portion 22a extending to the radially outer peripheral side at a position opposed to the cylindrical extension portion Sa with respect to the sun gear S. The flange portion 22a of the input shaft 22 is connected to the carrier CA of the planetary gear device 40. The gear meshing between the input shaft 22 and the sun gear S is the meshing between the pinion P of the planetary gear device 40 supported by the carrier CA and the sun gear S.

With the above configuration, the radial load of the sun gear S can be received by the engagement of the input shaft 22 and the rotor shaft RSmg1, and the bearing for receiving the radial load of the sun gear S is not required. The dimension in the first axis CL1 can be reduced by reducing the number of bearings to be subjected to radial loads.

The drive device 16 includes a first ball bearing 104, a second ball bearing 106, and a thrust bearing 108. The first ball bearing 104 is a bearing that rotatably supports the input shaft 22 with respect to the case 18. The thrust bearing 108 is a bearing disposed between the first axis CL1 one end surface Ss1 of the sun gear S and the input shaft 22. The flange portion 22a of the input shaft 22 is in contact with the first axis CL1 one end surface Ss1 of the sun gear S via the thrust bearings 108. The second ball bearing 106 is a bearing that abuts the first axis CL1 other end surface Ss2 of the sun gear S and rotatably supports the rotor shaft RSmg1 with respect to the case 18. The first axis CL1 end surface Ss2 of the sun gear S is a distal end surface of the cylindrical extension portion Sa.

With the above configuration, the sun gear S can be sandwiched between the thrust bearing 108 and the second ball bearing 106, and a bearing for receiving the thrust load of the sun gear S is not required. The dimension in the first axis CL1 can be reduced by reducing the number of bearings for receiving thrust loads.

In the drive device 16, the size along the first axis CL1 is shortened, so that the terminal block 100 can be installed. In the drive device 16, the terminal block 100 is arranged in a space D which is a space in the first axis CL1 caused by the reduction in the number of bearings and which is opposed to the planetary gear device 40 with respect to the first electric motor MG1. This makes it possible to reduce the size of the electromechanical integrated unit 90.

Referring to FIG. 4, the electric circuit unit 60 is disposed vertically above the first electric motor MG1 in the mounted condition of the vehicle 10.

The terminal block 100 is mounted in a space created by reducing the size of the mechanical transmission unit 92 in the first axis CL1, and the size of the electromechanical integrated unit 90 in the vertical direction is reduced. This creates a space above the electromechanical integrated unit 90 in the vertical direction.

Figure 5:
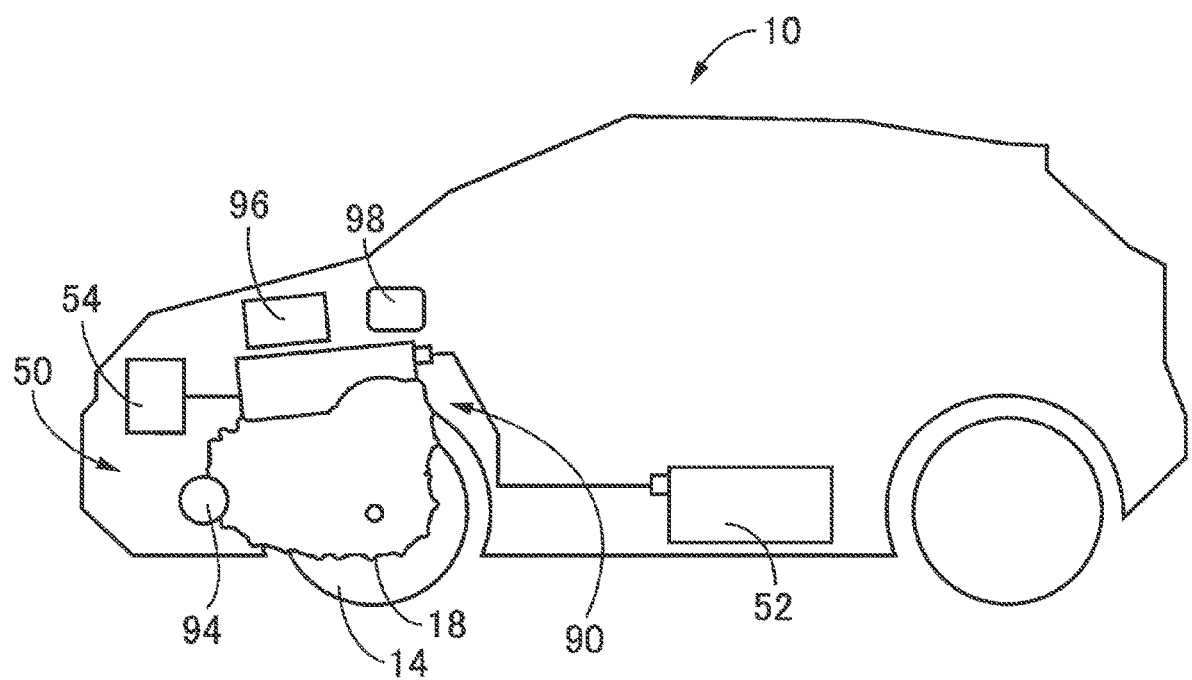
FIG. 5 is a diagram for explaining an example of a state in which an electromechanical integrated unit is mounted in a vehicle drive device.

FIG. 5 is a diagram illustrating an example of a state in which the electromechanical integrated unit 90 is mounted on the vehicle 10. In FIG. 5, the case 18 accommodating the electromechanical integrated unit 90 is disposed in the engine compartment 50. In the engine compartment 50, for example, an auxiliary battery 54, a water pump 94, an air cleaner 96, a reservoir tank 98, and the like are disposed. In particular, the air cleaner 96 and the reservoir tank 98 are arranged in a space created vertically above the electromechanical integrated unit 90. A high-voltage battery 52 is disposed below the indoor space of the vehicle 10.

As described above, in the drive device 16, the power is transmitted to the input shaft 22 and the rotor shaft RSmg1 by the sun gear S and the gear meshing, respectively. As a result, the dimension in the first axis CL1 can be reduced by reducing the number of bearings for receiving the radial load of the sun gear S. The drive device 16 includes a second ball bearing 106 and a thrust bearing 108. Accordingly, the dimension in the first axis CL1 can be reduced by reducing the number of bearings for receiving the thrust load of the sun gear S. In the drive device 16, the terminal block 100 is disposed in a space D that is formed by reducing the number of bearings and is opposed to the planetary gear device 40 with respect to the first electric motor MG1. Therefore, it is possible to dispose the terminal block 100 while suppressing or avoiding an increase in the size of the drive device 16.

The space in the first axis CL1 caused by the reduction in the number of bearings can be used to improve the performance of, for example, an increase in the product thickness of the first electric motor MG1 and an increase in the width of teeth of various gears.

Further, according to the present embodiment, the gear meshing between the rotor shaft RSmg1 and the sun gear S is a spline-fitting between the outer peripheral surface of the rotor shaft RSmg1 and the inner peripheral surface of the cylindrical extension portion Sa, so that the power is transmitted by the sun gear S and the gear meshing between the rotor shaft RSmg1. Since the gear meshing between the input shaft 22 and the sun gear S is the meshing between the pinion P and the sun gear S, the power is transmitted by the input shaft 22 meshing between the sun gear S and the gear.

Further, according to the present embodiment, since the flange portion 22a of the input shaft 22 is connected to the carrier CA, the power is transmitted by the input shaft 22 meshing with the sun gear S. Further, since the flange portion 22a of the input shaft 22 is in contact with the first axis CL1 one end surface Ss1 of the sun gear S via the thrust bearings 108, the thrust load of the sun gear S can be appropriately received. Since the other end surface Ss2 of the sun gear S in the first axis CL1 is the distal end surface of the cylindrical extension portion Sa, the thrust load of the sun gear S can be appropriately received.

In addition, according to the present embodiment, the electric circuit unit 60 is disposed vertically above the first electric motor MG1 in the mounted condition of the vehicle 10. As a result, it is possible to reduce the vertical physique of the electromechanical integrated unit 90 as compared with the case where the terminal block 100 is disposed between the electric circuit unit 60 and the first electric motor MG1.

Further, according to the present embodiment, since the case 18 houses the mechanical transmission unit 92 and the electric circuit unit 60 as the electromechanical integrated unit 90, it is possible to reduce the size of the drive device 16.

Further, according to the present embodiment, it is possible to reduce the number of components and the mounting process by reducing the number of bearings. As a result, the cost of the drive device 16 can be reduced.

Although the examples of the present disclosure have been described in detail with reference to the drawings, the present disclosure also applies to other modes.

For example, in the above-described embodiment, the electric circuit unit 60 is housed in the case 18 as the electromechanical integrated unit 90 together with the mechanical transmission unit 92, but the present disclosure is not limited to this embodiment. For example, the electric circuit unit 60 may be housed in a case different from the case in which the mechanical transmission unit 92 is housed. In this case, the electric circuit unit 60 may be disposed above the mechanical transmission unit 92 in the vertical direction, or may be disposed at a position different from the position above the mechanical transmission unit 92 in the vertical direction.

In addition, in the above-described embodiment, the vehicles 10 may be a so-called plug-in hybrid electric vehicle capable of charging the high-voltage battery 52 with electric power from an external power source. In plug-in hybrid electric vehicle, the degree of freedom in the arrangement position of the charger or the like is increased by the miniaturization of the drive device 16.

It should be noted that the embodiment described above is merely one embodiment, and the present disclosure can be implemented in a mode in which various changes and improvements are made based on the knowledge of those skilled in the art.

What is claimed is:

1. A vehicle drive device comprising:
an electric motor,
an input shaft to which power from an engine is input;
a rotor shaft integrally connected to a rotor of the electric motor;
a planetary gear device including a sun gear connected to the rotor shaft so as to be able to transmit power, a carrier connected to the input shaft so as to be able to transmit power, and a ring gear connected to a drive wheel so as to be able to transmit power; and
a case that is a non-rotating member disposed in an engine compartment in which the electric motor, the input shaft, the rotor shaft, and the planetary gear device are housed on a same axis, wherein:
in the vehicle drive device, the input shaft, the rotor shaft, and the sun gear are disposed such that power is transmitted when each of the input shaft and the rotor shaft meshes with the sun gear; and
the vehicle drive device includes
a first ball bearing that supports the input shaft with respect to the case such that the input shaft is rotatable,
a thrust bearing disposed between one end surface of the sun gear in a direction of an axis and the input shaft,
a second ball bearing that is in contact with another end surface of the sun gear in the direction of the axis and that supports the rotor shaft with respect to the case such that the rotor shaft is rotatable, and
a terminal block that is disposed in a space on an opposite side of the electric motor from the planetary gear device and that electrically connects an electric circuit unit for controlling the electric motor and the electric motor.

2. The vehicle drive device according to claim 1, wherein:
gear meshing between the rotor shaft and the sun gear is spline-fitting between an outer peripheral surface of the rotor shaft and an inner peripheral surface of a cylindrical extension portion provided on the sun gear and extending toward the electric motor in the direction of the axis; and
gear meshing between the input shaft and the sun gear is meshing between the sun gear and a pinion of the planetary gear device supported by the carrier so as to be able to rotate and revolve.

3. The vehicle drive device according to claim 2, wherein:
in the input shaft, a flange portion provided at a position on an opposite side of the sun gear from the cylindrical extension portion and extending in a radial direction on an outer peripheral side of the input shaft is connected to the carrier, and the flange portion is in contact with the one end surface of the sun gear in the direction of the axis via the thrust bearing; and
the other end surface of the sun gear in the direction of the axis is a distal end surface of the cylindrical extension portion.

4. The vehicle drive device according to claim 1, wherein the electric circuit unit is disposed above the electric motor in a vertical direction in a state in which the electric circuit unit is mounted on a vehicle.

5. The vehicle drive device according to claim 4, wherein the electric motor, the rotor shaft, the input shaft, the planetary gear device, and the electric circuit unit are housed in the case as an electromechanical integrated unit.

\* \* \* \* \*